Nov. 4, 1947.  B. C. COONS  2,429,991
FRUIT FEEDING AND ORIENTING APPARATUS
Original Filed Aug. 26, 1940   4 Sheets-Sheet 2

INVENTOR
BURTON C. COONS
BY
ATTORNEY

Nov. 4, 1947.  B. C. COONS  2,429,991
FRUIT FEEDING AND ORIENTING APPARATUS
Original Filed Aug. 26, 1940   4 Sheets-Sheet 3

INVENTOR
*BURTON C COONS*
BY
ATTORNEY

Patented Nov. 4, 1947

2,429,991

UNITED STATES PATENT OFFICE 2,429,991

FRUIT FEEDING AND ORIENTING APPARATUS

Burton C. Coons, San Jose, Calif., assignor to Food Machinery Corporation, San Jose, Calif., a corporation of Delaware Original application August 26, 1940, Serial No. 354,240, now Patent No. 2,375,350, dated May 8, 1945. Divided and this application February 8, 1944, Serial No. 521,523

13 Claims. (Cl. 198—33)

The present invention relates to a machine for handling fruit and more particularly to a fruit feeding and orienting apparatus to properly position fruit, such as cherries, in a mobile fruit holding means preparatory to subsequent operations to be performed on the fruit.

This application is a division of my copending application Serial No. 354,240 filed August 26, 1940, for Fruit handling machine.

An object of the present invention is to provide an improved automatic machine for feeding stem bearing fruit to a fruit holding and supporting means.

Another object is to provide an automatic feed mechanism for righting unstemmed fruit and for transferring the same in righted position to fruit holding and supporting means.

A further object is to provide a turret structure having fruit holding and supporting means for receiving the righted fruit from the automatic feed mechanism and for presenting the fruit in oriented condition to a fruit preparation machine.

Other objects and advantages of the present invention will become apparent from the following description taken in connection with the accompanying drawings, in which.

Figure 1:
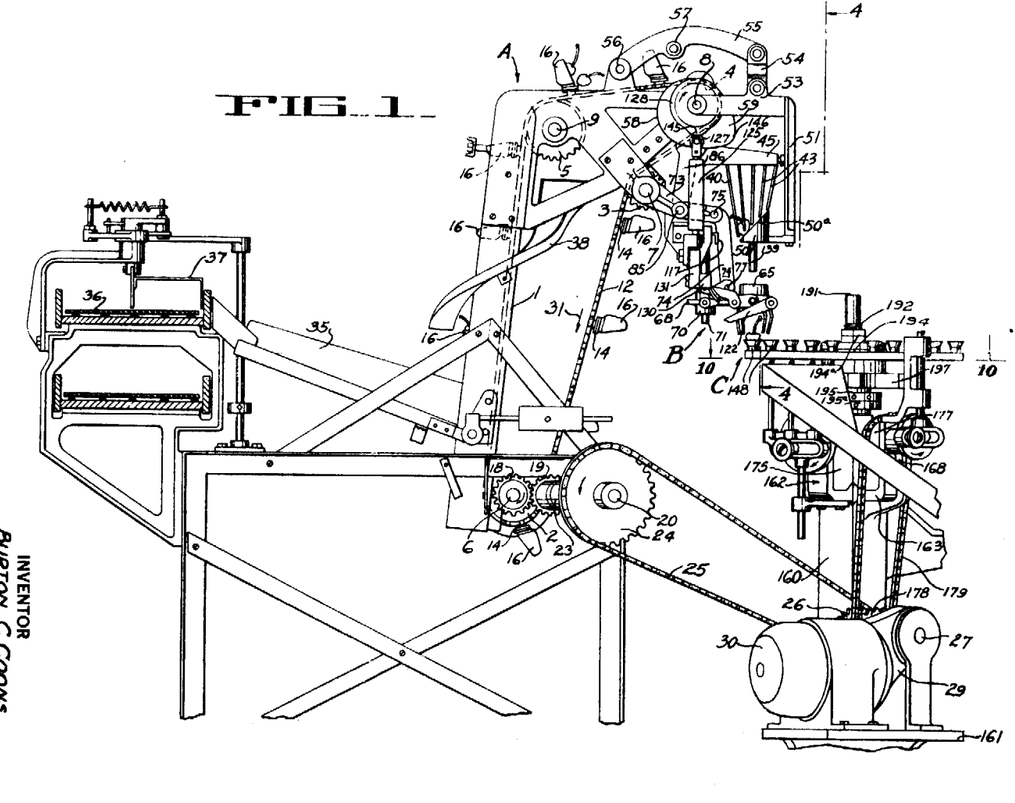
Fig. 1 is a side elevation of the complete machine of the present invention.
Figures 2, 10:
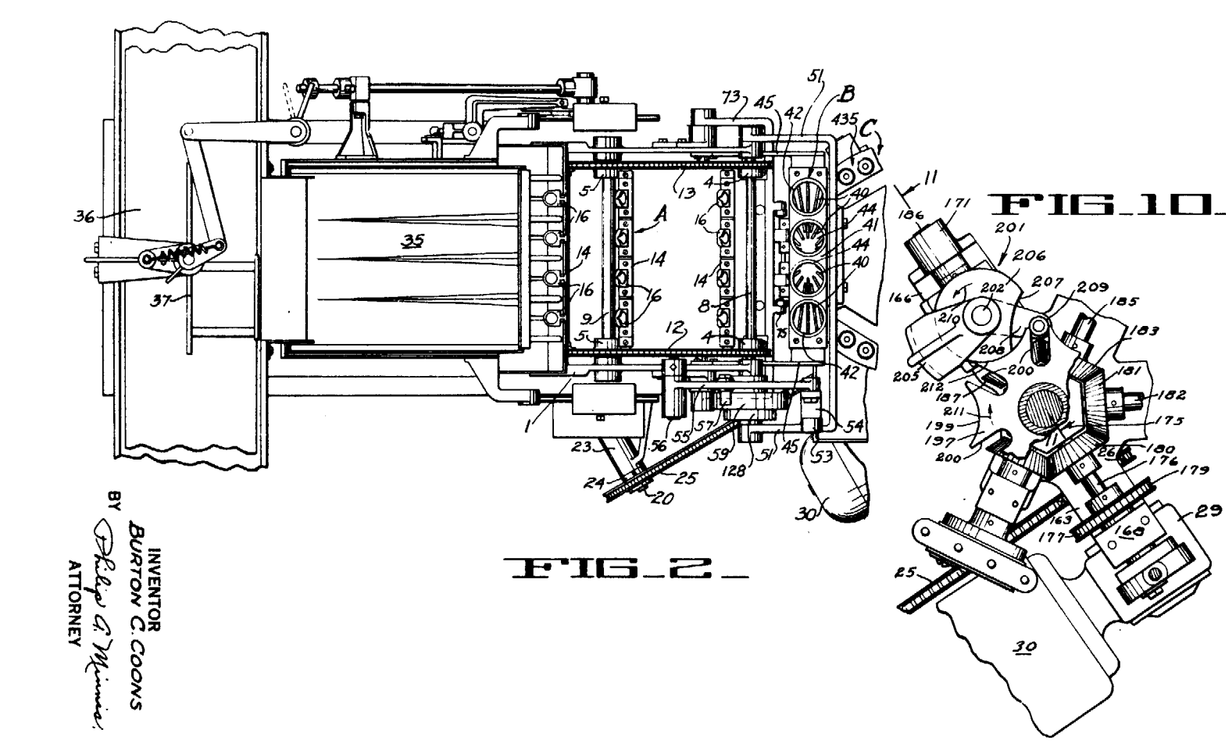
Fig. 2 is a plan view of the machine shown in Fig. 1.
Fig. 10 is an enlarged fragmentary section taken along lines 10—10 in Fig. 1 showing the drive mechanism of the machine, certain portions being broken away.

The fruit handling machine embodying the present invention, as will be best seen in Figs. 1 and 2 comprises a feed conveyor A, an automatic feed mechanism B and a turret C, by which the fruit is transmitted in proper position to special mechanisms for treatment, such as stemming, pitting, reshaping and ejecting, as is well described in my above mentioned copending application.

In the operation of the machine, the cherries are supplied by the conveyor A to the automatic feed mechanism B which rights the cherries and keeps them in proper position for reception by fruit supporting means on the turret C.

Feed conveyor

The feed conveyor A as will be seen from Figs. 1 and 2 comprises a frame structure 1 within which pairs of sprocket wheels 2, 3, 4 and 5 are rotatably mounted by means of shafts 6, 7, 8 and 9 respectively. Trained around these sprocket wheels are endless chains 12 and 13 provided with transverse bars 14, each carrying a series of fruit receiving buckets 16.

The shaft 6 of the feed conveyor A is provided with a bevel gear 18 fixed thereto and cooperating with a bevel gear 19 fixed to a shaft 20 rotatably mounted within a bearing 23 supported by the conveyor frame 1 in any convenient manner. Keyed to the shaft 20 is a sprocket wheel 24 and a drive chain 25 is trained around the sprocket wheel 24 and a sprocket wheel 26. The sprocket wheel 26 is fixed to a shaft 27 of a speed reduction mechanism 29 of an electric motor 30, so that upon operation of the motor 30 the shaft 20 is rotated, effecting rotation of the sprocket wheels 2 and causing travel of the conveyor chains 12 and 13 and the buckets 16 in the direction indicated by the arrow 31 in Fig. 1.

Mounted within the frame structure 1 adjacent the conveyor chains 12 and 13 is a hopper 35 for receiving the cherries to be pitted. The cherries may be supplied to the hopper 35 by means of a horizontal conveyor belt 36 and control gate 37 as illustrated in Fig. 1, or may be delivered to the hopper by means of a chute from the source of supply. If desired, the conveyor means for delivering the cherries to the hopper 35 may be omitted and the cherries may be dumped directly from their boxes into the hopper above referred to.

Figures 3, 6, 7, 8, 9:
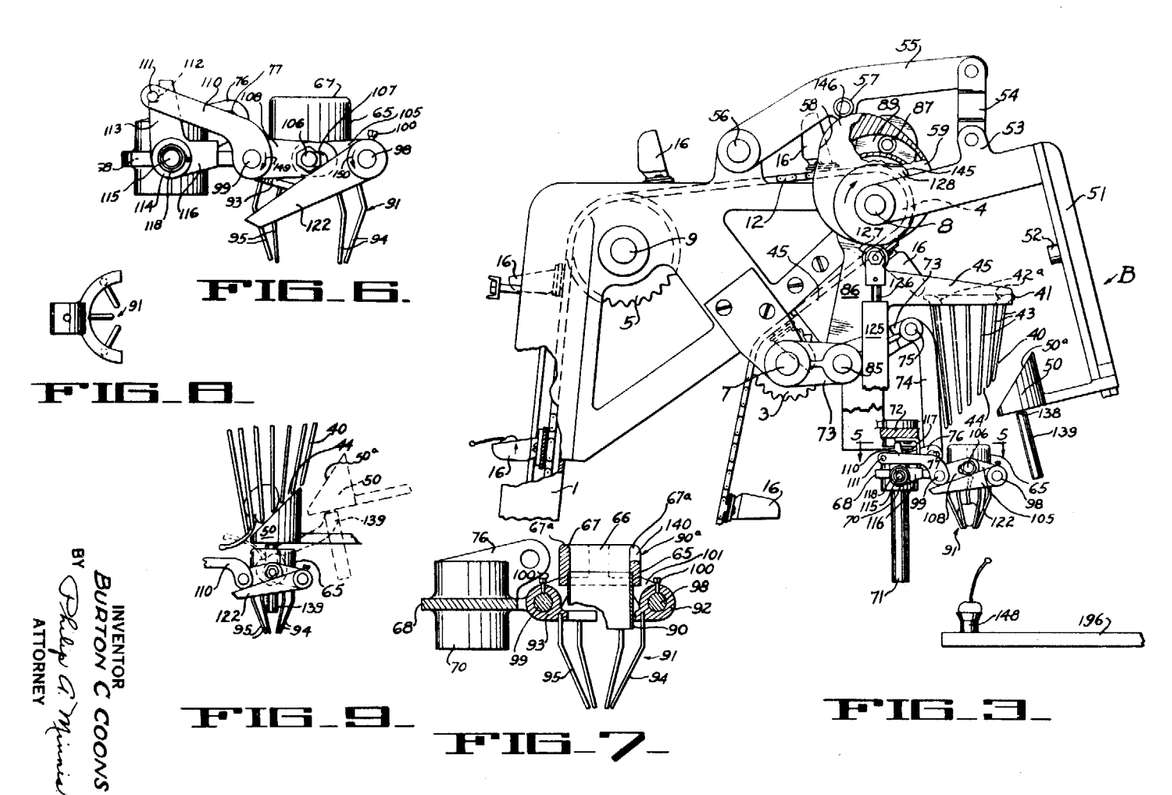
Fig. 3 is an enlarged side view of the automatic feed mechanism of the machine together with a portion of the feed conveyor and the turret associated therewith, certain portions being broken away and others shown in section.
Fig. 6 shows a side view of the transfer cage unit of Fig. 3 showing the transfer baskets thereof in locked and open position.
Fig. 7 is a section of the transfer cage unit taken along line 7—7 in Fig. 5 showing the transfer baskets in closed position.
Fig. 8 illustrates the detailed view of a portion of a transfer basket.
Fig. 9 is a fragmentary side view of the transfer cage and certain associated parts illustrating the operation thereof and showing primarily the manner in which a cherry is righted as it falls into the transfer cage.

During the travel of the conveyor chains 12 and 13 in the direction as indicated by the arrow 31 in Fig. 1 each series of buckets 16 passes through the hopper 35 and each bucket receives one cherry at a time and conveys the same to the automatic feed mechanism B into which the cherries are discharged from the buckets while the same pass around the sprocket wheel 4 as will be clearly seen from Figs. 1, 2 and 3.

In case two cherries are elevated by the fruit receiving cups 16 from the hopper 35, as shown in Fig. 1, the cherry not received within the bucket 16 will fall into the return chute 38 when the buckets travel around the sprocket wheels 5 and will be returned into the hopper 35.

In the drawings of the present application four fruit receiving buckets 16 have been illustrated on each one of the transverse bars 14, the automatic feed mechanism B and the turret C also being illustrated for handling four cherries at a time. However, the capacity of the machine may be increased by increasing the fruit handling capacity of these devices, as will be obvious to those skilled in the art.

Any other feed conveyor structure may be employed in connection with the machine described herein, or the cherries may be fed manually into the automatic feed mechanism B, provided however that the cherries are supplied to the automatic feed mechanism in proper timed relation therewith and in such numbers at a time as required by the capacity of the machine.

Automatic feed mechanism

The purpose of the automatic feed mechanism B which receives the cherries from the feed conveyor A is to righten the cherries and to place the same in fruit holding cups 148 of the turret C with the stems of the cherries in upward direction. The automatic feed mechanism operates in timed relation with the conveyor A and the turret C so that the transfer of the fruit to the fruit holding cups of the turret C is accomplished when the same are in a certain predetermined indexed position.

The automatic feed mechanism B is supported on the frame structure 1 of the feed conveyor A and is operated by the feed conveyor mechanism. However, if desired the automatic feed mechanism may be supported by a separate frame structure or other parts of the frame structure of the machine, and it may be independently operated by a separate drive mechanism associated with the motor 30, as will be obvious to those skilled in the art. In either case, a proper timing in the operation of the feed conveyor A, automatic feed mechanism B, and turret C may be easily obtained by means of speed reduction gears, or the like, because all of these devices are driven from a single source of motive power.

Referring now more specifically to the automatic feed mechanism B, as shown in Figs. 1 to 9 inclusive, it will be noted that the same comprises a plurality of stationary chutes or baskets 40, one chute being provided for each receiving bucket 16 of a single transverse bar 14 of the conveyor A. These chutes 40 are mounted on a chute frame 41 provided with perforations 42 which form inlet openings for admitting the cherries into the chute. The upper edges of the openings 42 are rounded, as best seen at 42ᵃ in Fig. 3, for purposes which will be explained later on. Each of these chutes is formed by a plurality of spaced, downwardly converging wires or rods 43 of different lengths, which form at their lower ends a discharge opening 44. The chute frame 41 is supported by brackets 45 secured to the frame 1 of the feed conveyor A of the machine.

The discharge openings 44 of the baskets or chutes 40 are normally closed by control gates 50 having an upper inclined surface 50ᵃ. These control gates are pivotally mounted on the shaft 8 of the feed conveyor by means of a frame 51. Stops 52 on the frame 51 engageable with the chute frame 41 hold the control gates in proper chute-closing position.

Pivotally attached to a lug 53 on the frame 51 is a link 54 which in turn is pivotally secured to roller arm 55 pivoted to the frame 1 of the feed conveyor A at 56. The roller arm 55 carries a roller 57 cooperating with the outer cam surface 58 of a cam 59 keyed to the shaft 8.

Upon rotation of the shaft 8 and cam 59, effected by the travel of the conveyor chains 12 and 13, the roller 57 travels along the outer cam surface 58 and effects a raising and lowering of the roller arm 55. This movement is transferred to the frame 51 by the link 54 and causes a pivotal movement of the frame 51 around the shaft 8 moving the gate members 50 to open the discharge openings 44 of the chutes 40 and to subsequently close the case.

Mounted below the chute 40 is a transfer cage 65 provided with a plurality of openings 66 (see Figs. 5 and 6), annular rims 67 with rounded upper edges 67ᵃ, and a transverse bar 68 comprising vertical sleeve bearings 70 slidably mounting the transfer cage 65 on guide rods 71 fixed to a transverse bar 72 carried by the brackets 45 (see Fig. 4). A yoke 73 pivotally mounted on the shaft 7 is connected with the transverse cage 65 by means of links 74 pivoted to the yoke at 75 and to lugs 76 of the transverse bar 68 at 77.

The yoke 73 (see Fig. 3) is pivotally connected at 85 to a yoke actuating arm 86 which straddles the shaft 8 and is provided with a roller 87 engaging a camway 89 of the cam 59 previously referred to. The camway 89 is eccentric to the shaft 8 and upon rotation of the same and cam 59 the yoke actuating arm 86 is oscillated, causing raising and lowering of the yoke 73 and the cage 65 supported thereby.

The cage 65 further comprises tubular members 90 secured to the lower portions of the rims 67 and in alignment with the openings 66 thereof. The rims 67 and tubular members 90 form righting member 90ᵃ for righting the fruit. Transfer baskets 91, each consisting of two sections 92 and 93 provided with downwardly converging fingers or rods 94 and 95, are fixed to transverse shafts 98 and 99 by means of set screws 100. These transverse shafts are rotatably supported within bearings 101 forming integral parts of the transfer cage 65, as will be best seen from Figs. 5 and 7.

Secured to shaft 98 is a link 105 provided with a pin 106 (see Figs. 5 and 6) engaging a slot 107 of a link 108 fixed to shaft 99 so that rotation of the shaft 99 in one direction causes a corresponding rotation of shaft 98 in an opposite direction. Also fixed to shaft 99 is a crank arm 110 provided with a pin 111 adapted to engage a notch 112 of the vertical arm 113 of a lock lever 114 pivotally mounted on the transverse bar 68 of the cage 65 by means of a stud shaft 115. A horizontal arm 116 of the lock lever 114 is adapted to engage a trip 117 (see Figs. 3 and 4) carried by the transverse bar 72, during the upward movement of the cage 65 and the lock lever 114 is thereby rocked, disengaging notch 112 from pin 111 and releasing the crank arm 110. A spring 118 (see Figs. 5 and 6) interposed between the stud shaft 115 and lock lever 114 urges the latter toward locking position so that the crank arm 110 is immediately locked when the pin 111 is adjacent the notch 112.

Figure 5:
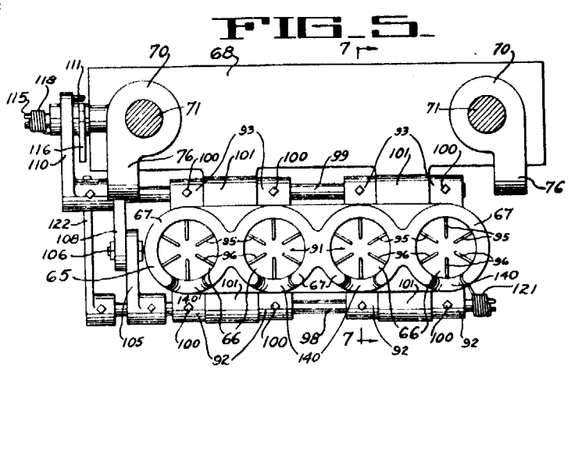
Fig. 5 is an enlarged plan view of the transfer cage unit of the automatic feed mechanism as seen from line 5—5 in Fig. 3.

A coil spring 121 interposed between the shaft 98 and the cage 65 urges the basket sections 92 and 93 of the transfer baskets 91 to closed position, as will be best seen from Fig. 5. A control arm 122 fixed in a predetermined position on shaft 98 is adapted to abut against crank arm 110 and determine the extent of closure of the transfer baskets 92 and 93 (see Fig. 9).

Attached to one of the brackets 45 (see Fig. 4) is a bearing bracket 125 within which an actuating rod 126 is slidably mounted. The upper end of this rod carries a roller 127 which engages a cam 128 fixed to shaft 8 adjacent to cam 59. The lower end of the actuating rod 126 is pivotally connected to a trip arm 130 by means of a link 131 and pivot pins 132 and 133, and the trip arm 130 in turn is pivotally secured to one of the brackets 45 at 134. The free end 135 of this trip arm 130 extends into the path of the crank arm 110 engaging the same from below thereof. The actuating arm 126 is further provided with a collar 136 fixed thereto and interpositioned between this collar and the bearing bracket 125 is a coil spring 137 for maintaining the roller 127 in engagement with the cam 128.

The gate members 50 above referred to are provided with downwardly extending pins 138 which are concentric to the openings 66 of the transfer gate 65, when the same is in a position as shown in Fig. 1. The pins 138 carry flexible basket cleaners 139, which may be preferably made from a piece of rubber tube. These basket cleaners 139 are adapted to enter into the transfer cage and baskets and dislodge any fruit adhering to the same.

The rims 67 of the transfer cage 65 are provided with notches 140 (see Fig. 7) through which the rubber tubes 139 flip out (see Fig. 9) when the frame 51 and gate members 50 are moved to their outward position, as shown in dotted lines in Fig. 9 and in full lines in Fig. 3.

Figure 4:
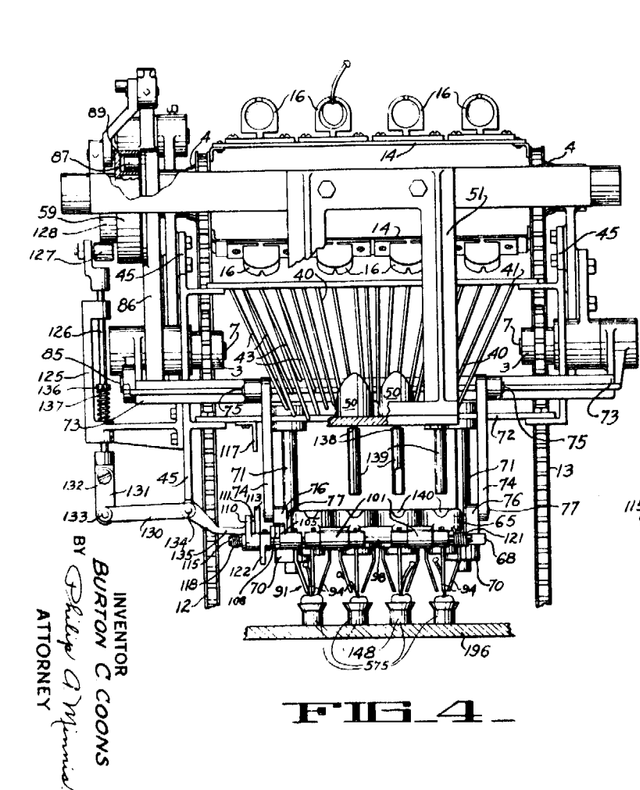
Fig. 4 is a rear view of the automatic feed mechanism taken along line 4—4 of Fig. 1, certain portions being broken away and others being shown in section.

From Fig. 4 it will be noted that the chutes 40 are so positioned with respect to the feed conveyor A and transfer cage 65 that the cherries discharged from the buckets 16 into the chutes 40 are fed to the transfer cage 65 and fall through the tubular members 90 into the transfer baskets 91 which place the fruit into fruit holding cups of the turret C with the stems of the cherries in upward position.

When the cherries are discharged from the buckets 16 of the feed conveyor A into the chutes 40, the parts of the automatic feed mechanism B are in a position as shown in Fig. 1.

The cherries falling from the feed conveyor into the chute 40 will be righted during their free fall due to the air resistance upon the stems and consequent turning of the fruit. This righting of the fruit is assisted by the rounded edges 42ª of the chute frame 41 adjacent the openings 42 against which the stems may strike while the cherries fall through the openings 42. The cherries fall, therefore, upon the control gates 50, with the stems pointing in substantially upward direction, and due to the inclined surface 50ª of the gates, the cherries will roll down the same and assume a position as shown in Fig. 1, or any other position, with the stems pointing either upwardly within the chutes or protruding laterally therefrom at various angles through the open spaces between the wires or rods 43 (see Fig. 4).

Occasionally cherries will fall into the chutes 40 with the stem of the fruit pointing in a downward direction, and in such case, the fruit will not be righted during their fall and the free end of the stems will contact the gates 50 and slide downward the inclined surface 50ª of the same and project laterally through the open spaces between the rods 43 of the chutes so that the cherries will assume a position as shown in Fig. 9.

During the above described operation, i. e., while the cherries are positioned within the chutes 40, the transfer cage 65 is in its lowermost position, and the transfer baskets 92 and 93 are locked in open position.

During the continuous rotation of the shaft 8 of the feed conveyor A the cams 59 and 128 will be rotated in a direction as indicated by an arrow in Fig. 1, and the cam portion 145 of the cam 128 will disengage from the roller 127 of the actuating rod 126 and permit the same to move upwardly under the influence of spring 137, so that the free end 135 of the trip arm 130 disengages the crank arm 110.

Thereupon the inner cam track 89 and cam 59 which engages the roller 87 causes upward movement of the actuating arm 86 which in turn effects a pivotal movement of the yoke 73 around shaft 7 and raises the links 74 and the transfer cage unit 65 to its uppermost position, as shown in Figs. 3 and 9.

During the above described upward movement of the transfer cage 65 the basket cleaners 139 on the gate members 50 project into the transfer basket 91 and dislodge any cherries which may adhere or stick to the transfer baskets, so that the same will fall downwardly therefrom.

Shortly before the transfer cage 65 reaches its uppermost position the horizontal portion 116 of the lock lever 114 strikes against the trip 117 and rocks the lock lever and disengages the notch 112 of the same from the pin 111 of the crank arm 110. This unlocks the transfer basket portions 92 and 93 and the same move immediately to closed position under the influence of the spring 121. The extent of closing of the basket portions 92 and 93 is controlled by the control arm 122, which abuts against the crank arm 110, as will be seen from Fig. 3. The transfer cage 65 and the control gates 50 are now in a position as shown in full lines in Fig. 9.

When the parts are in the position as above described, the portion 146 of cam 59 engages the roller 57 (see Fig. 3) and raises the roller arm 55, which pivots around the pivot pins 56. Due to the fact that the roller arm 55 is pivotally connected to the frame 51 by means of the link 54, frame 51 pivots around shaft 8 and the gates 50 move outwardly away from the chute 40 to the position as shown in Fig. 3. The cherries drop from the chute 40 into the transfer cage 65 and are held within the transfer baskets 91, which at this time are in closed position.

While the control gates 50 move outwardly, as above described, the basket cleaners 139 flip outwardly from within the transfer cage 65 through the notches 140 in a manner as clearly illustrated in dotted lines in Fig. 9.

While the cherries fall downwardly from the chutes 40 into the transfer baskets 91, they pass through the openings 66, rims 67 and tubular members 90 of the righting members 90ª associated therewith. The rims 67 engage the stems of the cherry and while the cherries fall through the tubular members 90 into the baskets 91, the stems of the fruits are righted into upwardly pointing position.

In this connection, it may be mentioned that when the cherries are positioned within the chutes 40 upon the control gates 50, the stems of the cherries can never assume a straight downward position which would permit them to pass through the righting members 90ª ahead of the fruit, in other words, the drupe of the fruit will at all times enter the righting member first. Usually, the stems of the cherries will assume the positions as shown in full lines in Figs. 1 or 9 and when the cherries thereafter drop into the transfer baskets 91, the stems will always be righted by contact with the rims 67 and tubular members 90 to a substantial vertical position, as best seen from Fig. 3. If the cherries, however, become arranged with their stems pointing upwardly within the chute 40 while they are held therein by the gate members 50, they will fall straight down into the transfer baskets 91 when the gate members move outwardly to a position as shown in Fig. 3, and in this case no additional righting of the cherries within the transfer cage 65 is necessary as the stems of the cherries are already in the desired position.

The angle of inclination of the inclined surfaces 50ª of the control gate may be preferably between 45 and 60 degrees, so as to assure the proper positioning of the cherries and to prevent any lateral movement or rotation of the fruit during opening of the control gate which would disalign the cherries with respect to the righting members 90ª and tend to pull the stems into the openings 66 ahead of the fruit.

With the cherries positioned within the transfer baskets 91 as above described, cam 59, roller 87, and actuating arm 86 cause a downward movement of yoke 73, links 74, and the transfer cage 65, so as to position the transfer baskets 91 directly above and in close proximity to fruit holding cups 148 of the turret C. Thereupon, the portion 145 of cam 128 strikes the roller 127 and causes a downward movement of the actuating rod 126. This produces an upward movement of the free end 135 of the trip arm 130, which engages the crank arm 110 and moves the same upwardly to the position as shown in Fig. 6. The pin 111 of the crank arm 110 enters the slot 112 of the lock lever 114, and locks the crank arm 110 in the position as shown in Fig. 6.

The above described movement of the crank arm 110 from the position shown in Fig. 3 to the position shown in Fig. 6 causes rotation of the shaft 99 in the direction as shown by the arrow 149 in Fig. 6 and a corresponding rotation in an opposite direction, as indicated by an arrow 150 in Fig. 6, of the shaft 98, in view of the linkage connection 105 and 108 previously referred to. The transfer basket portions 92 and 93 will move to their open position, as shown in Fig. 6, and the cherries held between the fingers 94 and 95 of the transfer baskets 91 will drop into the fruit holding cups 148 of the turret C, as will be best seen from Fig. 4, with the stems of the cherries pointing in an upward direction.

Incident to the downward movement of the transfer cage 65, the portion 146 of cam 59 disengages from the roller 57, and frame 51, due to its own gravity, returns to its original position as shown in Fig. 1, positioning the gate members 50 below the discharge openings of the chutes 40. Thereupon, the next row of cherries are now discharged into the chutes 40 by the succeeding series of buckets 16 of the feed conveyor A and the cycle of operation of the automatic feed mechanism B repeats during the continuous operation of the machine in the same manner as above described.

*Turret frame structure and drive*

The frame structure of the turret C comprises a frame or standard 160 provided with a bracket 161 upon which the motor 30, previously referred to, is mounted. The upper portion of the base 160 is formed into a spider structure generally indicated at 162, which comprises a plurality of radially extending spider arms such as arms 163, 166 provided with vertically extending portions 168 and 171 respectively. The frame portion 160 further comprises a hexagonal central body portion 175 as will be best seen in Figs. 1 and 10.

Rotatably mounted within the vertical portion 168 of the spider arm 163 and the hexagonal portion 175 is a drive shaft 176 provided with a sprocket wheel 177 keyed thereto. Trained around this sprocket wheel 177 and a sprocket wheel 178 secured to the shaft 27 of the gear reduction drive 29 of the motor 30 is a driven chain 179 for driving the drive shaft 176 upon operation of the motor 30. Secured to the drive shaft 176 is a bevel gear 180 which intermeshes with a bevel gear 181 fixed to a shaft 182 suitably mounted for rotation on the hexagonal body portion 175. The bevel gear 181 is in engagement with a bevel gear 183 keyed to a shaft 185 suitably mounted for rotation on the hexagonal body portion 175. In a similar manner, an index drive shaft 186 (see also Fig. 11) is rotatably mounted within the hexagonal body portion 175 and the vertically extending portion 171 of the spider arm 166. Fixed to the shaft 186 is a bevel gear 187 which intermeshes with the bevel gear 183 previously mentioned.

From the above it will be noted that upon operation of the motor 30, shaft 176 will be rotated to rotate the bevel gear 180 in turn rotating each of the bevel gears 181, 183 and 187 related thereto to effect operation of the turret indexing mechanism now to be explained.

Figure 11:
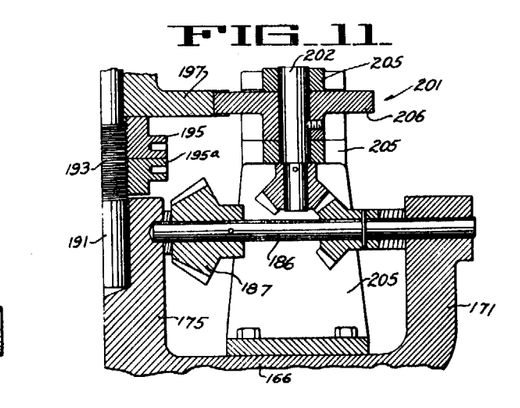
Fig. 11 is an enlarged section of the turret index mechanism taken along lines 11—11 in Fig. 10.

The upper end of the hexagonal body portion 175 of the turret frame 160 is provided with a stationary vertical stud shaft 191 having threaded portion 192 and 193 (see Figs. 1 and 11). Threadedly secured to the shaft portion 192 is a retaining flange 194 and a lock nut 194ª, while an adjusting nut 195 and a lock nut 195ª are threadedly secured to the shaft portion 193. Freely rotatable on the stud shaft 191 intermediate the retaining flange 194 and adjusting nut 195 and supported by the latter is the turret C, which consists of a table 196 provided with a plurality of fruit holding members 148, previously mentioned, and an index plate 197. This index plate 197 may be integral with the table 196 or may be a separate part secured to the table in any convenient manner for rotation therewith.

From the above it will be seen that the table 196, the fruit holding means 148 and index plate 197 are adjustable in vertical directions on the stud shaft 191 by manipulation of the retaining flange 194 and adjusting nut 195 after loosening of the lock nuts 194a and 195a, so that the fruit holding members 148 may be properly adjusted with respect to the automatic feed mechanism B.

The fruit holding cups 148 are arranged in rows of four, and these rows are angularly positioned with respect to each other, forming chords of the circle defined by the table 196.

The index plate 197 comprises arcuate faces 199 and elongated radially extending slots 200, as will be best seen from Fig. 10.

The index mechanism generally indicated at 201 (see Figs. 10 and 11) consists of a vertical shaft 202 which is rotatably mounted within a bracket 205 secured to the spider arm 166 and provided near its upper end with a locking plate 206, comprising a cut out portion 207, and an index arm 208 carrying a roller 209.

During the rotation of the shaft 202 and index arm 208 in the direction of the arrow 210 in Fig. 10, the roller 209 enters one of the elongated slots 200 of the index plate 197 and causes rotation of the latter in the direction of the arrow 211 until the arcuate face 199 following such slot is in engagement with the locking plate 206 and locked by the peripheral face 212 of the same against further rotation.

At this time, the parts of the index mechanism are in a position as shown in Fig. 10, and the roller 209 now leaves the respective slot 200 and the index plate 197 remains in locked position until the roller 209 enters the next slot 200 of the index plate 197 and causes further rotation of the same. It will be observed from Fig. 10 that upon entry of the roller 209 into one of the elongated slots 200 of the index plate 197, the cut out portion 207 of the locking plate 206 will be in such a position with respect to the index plate 197 that the latter may rotate without interfering with the locking plate 206.

The elongated slots 200 are disposed at angles of 60 degrees with respect to each other corresponding to the angular position of the rows or series of fruit receiving members 148, and the arcuate faces 199 of the index plate 197 are disposed intermediate the elongated slots 200, as will be clearly seen from Fig. 10.

The index mechanism 201 above described will therefore effect an intermittent rotation of the turret C, so that a corresponding advancement of the series of fruit holding members 148 to and from the automatic feed mechanism B, as well as to and from stemming, pitting, reshaping and ejecting mechanisms arranged around the turret, as shown in my aforementioned copending application.

*Operation*

In the above description of the construction of the machine the operation of the various parts thereof has been specifically explained. However, for a more complete understanding a résumé of the entire cycle of operation of the machine will now be given wherein the function of the various units will be set forth in proper sequence and timed relation.

It has been stated hereinbefore that the entire mechanism of the machine is operated from a single source of power and it will be noted that upon operation of the motor 30 shafts 20, 176, 182, 185, 186 are continuously driven at predetermined speeds so as to effect the operation of the feed conveyor A, automatic feed mechanism B and the turret C.

The shaft 186 operates the index mechanism and causes intermittent rotation of the turret C, so that the series of cups 148 are advanced in intermittent motion past the various fruit handling devices above referred to.

Beginning now the cycle of operation of the machine, it will be noted that the rotation of shaft 20 causes a continuous operation of the feed conveyor A and the fruit receiving buckets 16 thereof supply successive rows of fruit to the chutes 40 of the automatic feed mechanism B of the machine in predetermined intervals.

When a row of fruit is discharged from the feed conveyor A into the chutes 40 of the automatic feed mechanism B the parts of the latter are in a position as shown in Fig. 1. The discharge openings of the chutes 40 are closed by the control gates 50 and the cherries drop upon the inclined surfaces 50a of the gates and roll downwardly along the latter so as to engage themselves with the stems protruding from the chutes 40 substantially in a manner as shown in Figs. 1 and 9.

Thereupon the transfer baskets 65 are raised and their sections 92 and 93 are moved to closed position (see Fig. 9). The control gates 50 are swung to open position and the cherries are dropped into transfer baskets 91. While the cherries fall through the righting members 90a they are righted so that their stems point in upward direction.

Incident to the transfer of the cherries from the chutes 40 to the transfer baskets 91, while the latter remain in their uppermost position, the indexing mechanism 201 rotates the turret C and the series of fruit holding cups is moved into alignment with the automatic feed mechanism B.

Thereupon, the transfer baskets 91 are lowered and subsequently opened and the cherries are placed in righted position into the cups 148 of the series of cups.

While the transfer baskets move downwardly the control gates 50 move to closed position and the next row of cherries is discharged from the feed conveyor A into the chutes 40 and the cycle of the feed mechanism repeats in the same manner as stated above.

Thereupon the index mechanism 201 effects another rotation of the turret C and the series of fruit holding cups is advanced from below the automatic feed mechanism to the position 435 (see Fig. 2). This is a blank position intermediate the automatic feed mechanism B and the stemming mechanism (not shown) and no operations are performed upon the cherries in this position. The same indexing operation of the index mechanism 201 in rotating the turret C places a new and different series of empty fruit holding cups below the feed mechanism B to receive the next series of fruit therefrom.

By the foregoing arrangement the cherries deposited in the cups 148 are all positioned with their stems extending substantially vertical so that they may be engaged by certain operating mechanism about the periphery of the turret C for further handling and particular treatment.

While I have described a particular embodiment of the present invention, it will be understood that various changes and modifications may be made without departing from the spirit of the present invention and the scope of the appended claims.

Having thus described my invention and in what manner the same may be used, what I claim as new and desire to protect by Letters Patent is:

1. A feed mechanism for fruit pitting machines comprising a chute, means for supplying stem bearing fruit to said chute, a control gate associated with said chute for controlling the discharge of fruit therefrom and including an inclined surface for arranging fruit falling stem end first into the chute in predetermined position relative to the same, means for operating the control gate for discharging the fruit from the chute, and means cooperating with the chute and control gate for receiving the discharged fruit for righting the same.

2. A feed mechanism for fruit pitting machines comprising a chute formed by a plurality of spaced members, means for supplying fruit to said chute, a control means associated with said chute for controlling the discharge of fruit therefrom including an inclined surface for arranging the fruit in predetermined position in the chute with the stem of the fruit laterally protruding from the chute, means for operating the control means for discharging the fruit from the chute, and means cooperating with the chute and control means for receiving the discharged fruit for righting the same.

3. A fruit handling machine comprising fruit holding means, a substantially vertical chute above said fruit holding means for receiving one unstemmed fruit at a time, a control gate for intercepting the free fall of the fruit within said chute and having an inclined surface for turning fruit falling into the chute stem end first into a position with its stem extending laterally therefrom, means for opening said control gate for discharging the fruit from the chute, transfer means normally disposed for receiving the fruit from said chute for righting the fruit with its stem extending upwardly and movable toward said fruit holding means for transferring the righted fruit to the same, means for releasing the fruit from said transfer means as the latter arrives at the fruit holding means, and means for operating said control gate and transfer means in timed relation with respect to each other.

4. A feed mechanism for fruit pitting machines comprising a substantially vertical open ended chute formed of spaced members, means for dropping stem bearing fruit one at a time into the chute, means in said chute and cooperating therewith for intercepting the free fall of fruit therein and for positioning fruit falling in the chute stem first into a predetermined position with the stem of the fruit projecting laterally from the chute, fruit righting means below the chute and having a portion engageable by laterally extending stems of fruit entering the same, and means for operating said intercepting means for subsequently admitting the fruit into the righting means for righting the fruit.

5. A machine for handling unstemmed cherries, comprising stationary fruit receiving means having a side wall provided with openings, means for depositing cherries one at a time into the receiving means, a deflector plate associated with the lower end of said receiving means and having an inclined surface for guiding the stems of cherries falling stem end down through an opening in said side wall of the receiving means, and means for withdrawing the deflector plate from beneath the receiving means for releasing the cherries for gravitation with their stems disposed in other than a vertically downward position.

6. A mechanism for feeding unstemmed fruit into a fruit treating machine stem end up comprising fruit holding means, means for dropping one fruit at a time toward the fruit holding means, means for receiving the dropping fruit and for guiding the same toward said fruit holding means, means for obstructing the fall of fruit through said guiding means and having an inclined surface for engaging the stem of a fruit falling stem end first to turn the stem laterally as the fruit gravitates into position on the obstructing means, means operable in timed relation with said fruit dropping means for withdrawing said obstructing means out of the path of the obstructed fruit whereby the latter descends toward said fruit holding means, and means between said fruit holding means and said guiding means for rightening the stem of the fruit descending therefrom and for depositing the fruit with the stem end thereof in rightened position into said fruit holding means.

7. A fruit handling machine comprising downwardly converging rods forming a chute for receiving fruit one at a time and having a diagonally opened bottom, means for closing the bottom of said chute for obstructing the fall of the fruit therethrough and for deflecting the stem of fruit falling stem end first laterally of said chute, and means for withdrawing said obstructing means from beneath said chute for releasing the fruit for free fall therefrom with the stem of the fruit substantially laterally disposed.

8. In a fruit pitting machine, mechanism for feeding stem bearing fruit thereto comprising a plurality of downwardly converging bars of different lengths to form a cage having a diagonally disposed discharge opening at its lower end, means for depositing fruit one at a time into the upper end of said cage for free fall therethrough, means for closing said discharge opening whereby a fruit falling stem end first is deflected into a position with its stem extending laterally from said cage, means for withdrawing said closing means from said opening to release the fruit from said cage, and transfer means for receiving the fruit from the cage and for delivering the fruit to said pitting machine stem end up.

9. In a mechanism for feeding stem bearing fruit to a fruit pitting machine, a fruit receiving cage having downwardly converging bars of different lengths to form a diagonally disposed discharge opening, movable means normally disposed to close said opening for obstructing the free fall of fruit therethrough and for deflecting the stem of a fruit falling stem end first between said bars thereby positioning said fruit for gravitation with its stem end laterally disposed, means for momentarily withdrawing said movable means from obstructing position relative to said opening, reciprocable transfer means beneath said cage for receiving fruit from the cage and including a stem engaging portion engageable by laterally disposed stems of gravitating fruit, and means for reciprocating said transfer means whereby the latter deposits the fruit stem end up into said pitting machine.

10. In a fruit handling machine including means for holding individual fruit stem end up, mechanism for feeding fruit to said fruit holding means comprising downwardly converging rods forming a chute for receiving fruit and having a diagonally opened bottom, means for closing the bottom of said chute and engageable by the stem of a fruit falling stem end first into the chute for deflecting the stem thereof sidewise into a position laterally of said chute, transfer means beneath said chute and having a stem engaging rim engageable by a laterally extending stem of a falling fruit for turning the stem into a substantially vertical position, means for moving said chute closing means from beneath said chute to release the fruit for free fall into the transfer means, means for operating the transfer means for lowering the fruit toward said fruit holding means, and means for releasing the fruit from said transfer means for descent into said fruit holding means.

11. A mechanism for feeding unstemmed fruit into a fruit treating machine stem end up comprising fruit holding means, means for dropping one fruit at a time toward the fruit holding means, means for receiving the dropping fruit and for guiding the same toward said fruit holding means, means for obstructing the fall of fruit through said guiding means and having an inclined surface for engaging the stem of fruit falling stem end first to turn the stem laterally as the fruit gravitates, means operable in timed relation with said fruit dropping means for withdrawing said obstructing means out of the path of the obstructed fruit whereby the latter descends toward said fruit holding means, and for engaging laterally extending stems of descending fruit whereby the fruit descends toward the fruit holding means stem end up.

12. A mechanism for feeding unstemmed fruit into a fruit treating machine stem end up comprising fruit holding means, means for dropping one fruit at a time toward the fruit holding means, means for receiving the dropping fruit and for guiding the same toward said fruit holding means, means for obstructing the fall of fruit through said guiding means and having an inclined surface for engaging the stem of a fruit falling stem end first to turn the stem laterally as the fruit gravitates, means operable in timed relation with said fruit dropping means for withdrawing said obstructing means out of the path of the obstructed fruit whereby the latter descends toward said fruit holding means, transfer means for receiving the descending fruit and having a stem engaging portion engageable by laterally disposed stems of descending fruit, and means for operating the transfer means for releasing the fruit for descent therefrom and for causing laterally disposed stems of descending fruit to swing into a substantially upright position to thereby deposit the fruit into the fruit holding means stem end up.

13. A feed mechanism for fruit pitting machines comprising a substantially vertical open ended chute formed of spaced members, means for dropping stem bearing fruit one at a time into the chute, means cooperating with said chute for intercepting the free fall of fruit therein and for positioning fruit falling in the chute stem first into a predetermined position with the stem of the fruit projecting laterally from the chute, reciprocable transfer means below the chute for receiving fruit from the chute and including a stem engaging portion engageable by laterally projecting stems of falling fruit, means for reciprocating said transfer means whereby the latter deposits the fruit stem end up into said pitting machine, flexible means associated with said intercepting means and adapted to enter said transfer means as the latter moves toward said chute for dislodging fruit adhering to said transfer means, and means for operating said intercepting means and the flexible means for withdrawing the latter from the transfer means and for releasing the positioned fruit for descent into said transfer means.

BURTON C. COONS.

REFERENCES CITED

The following references are of record in the file of this patent:

UNITED STATES PATENTS

| Number | Name | Date |
|---|---|---|
| 1,698,477 | Frova | Jan. 8, 1929 |
| 2,154,412 | Romberg et al. | Apr. 12, 1939 |
| 2,251,158 | Ogrodowy | July 29, 1941 |

FOREIGN PATENTS

| Number | Country | Date |
|---|---|---|
| 625,009 | France | Apr. 16, 1927 |

Certificate of Correction

Patent No. 2,429,991.                               November 4, 1947.

BURTON C. COONS

It is hereby certified that errors appear in the printed specification of the above numbered patent requiring correction as follows: Column 4, line 40, for the words "the case" read *the same*; column 8, line 64, for "portion" read *portions*; and that the said Letters Patent should be read with these corrections therein that the same may conform to the record of the case in the Patent Office.

Signed and sealed this 16th day of March, A. D. 1948.

[SEAL]

THOMAS F. MURPHY,
*Assistant Commissioner of Patents.* bottom of said chute and engageable by the stem of a fruit falling stem end first into the chute for deflecting the stem thereof sidewise into a position laterally of said chute, transfer means beneath said chute and having a stem engaging rim engageable by a laterally extending stem of a falling fruit for turning the stem into a substantially vertical position, means for moving said chute closing means from beneath said chute to release the fruit for free fall into the transfer means, means for operating the transfer means for lowering the fruit toward said fruit holding means, and means for releasing the fruit from said transfer means for descent into said fruit holding means.

11. A mechanism for feeding unstemmed fruit into a fruit treating machine stem end up comprising fruit holding means, means for dropping one fruit at a time toward the fruit holding means, means for receiving the dropping fruit and for guiding the same toward said fruit holding means, means for obstructing the fall of fruit through said guiding means and having an inclined surface for engaging the stem of fruit falling stem end first to turn the stem laterally as the fruit gravitates, means operable in timed relation with said fruit dropping means for withdrawing said obstructing means out of the path of the obstructed fruit whereby the latter descends toward said fruit holding means, and for engaging laterally extending stems of descending fruit whereby the fruit descends toward the fruit holding means stem end up.

12. A mechanism for feeding unstemmed fruit into a fruit treating machine stem end up comprising fruit holding means, means for dropping one fruit at a time toward the fruit holding means, means for receiving the dropping fruit and for guiding the same toward said fruit holding means, means for obstructing the fall of fruit through said guiding means and having an inclined surface for engaging the stem of a fruit falling stem end first to turn the stem laterally as the fruit gravitates, means operable in timed relation with said fruit dropping means for withdrawing said obstructing means out of the path of the obstructed fruit whereby the latter descends toward said fruit holding means, transfer means for receiving the descending fruit and having a stem engaging portion engageable by laterally disposed stems of descending fruit, and means for operating the transfer means for releasing the fruit for descent therefrom and for causing laterally disposed stems of descending fruit to swing into a substantially upright position to thereby deposit the fruit into the fruit holding means stem end up.

13. A feed mechanism for fruit pitting machines comprising a substantially vertical open ended chute formed of spaced members, means for dropping stem bearing fruit one at a time into the chute, means cooperating with said chute for intercepting the free fall of fruit therein and for positioning fruit falling in the chute stem first into a predetermined position with the stem of the fruit projecting laterally from the chute, reciprocable transfer means below the chute for receiving fruit from the chute and including a stem engaging portion engageable by laterally projecting stems of falling fruit, means for reciprocating said transfer means whereby the latter deposits the fruit stem end up into said pitting machine, flexible means associated with said intercepting means and adapted to enter said transfer means as the latter moves toward said chute for dislodging fruit adhering to said transfer means, and means for operating said intercepting means and the flexible means for withdrawing the latter from the transfer means and for releasing the positioned fruit for descent into said transfer means.

BURTON C. COONS.

REFERENCES CITED

The following references are of record in the file of this patent:

UNITED STATES PATENTS

| Number | Name | Date |
|---|---|---|
| 1,698,477 | Frova | Jan. 8, 1929 |
| 2,154,412 | Romberg et al. | Apr. 12, 1939 |
| 2,251,158 | Ogrodowy | July 29, 1941 |

FOREIGN PATENTS

| Number | Country | Date |
|---|---|---|
| 625,009 | France | Apr. 16, 1927 |

---

Certificate of Correction

Patent No. 2,429,991.                                      November 4, 1947.

BURTON C. COONS

It is hereby certified that errors appear in the printed specification of the above numbered patent requiring correction as follows: Column 4, line 40, for the words "the case" read *the same*; column 8, line 64, for "portion" read *portions*; and that the said Letters Patent should be read with these corrections therein that the same may conform to the record of the case in the Patent Office.

Signed and sealed this 16th day of March, A. D. 1948.

[SEAL]

THOMAS F. MURPHY,
*Assistant Commissioner of Patents.*